INVENTOR
D. V. WATERS
BY
E.R. Nowlan
ATTORNEY

May 2, 1939. D. V. WATERS 2,157,043
INTERLOCKING CONTROL SYSTEM
Filed Sept. 1, 1937 4 Sheets-Sheet 3

INVENTOR
D. V. WATERS
BY
E.R. Nowlan
ATTORNEY

Patented May 2, 1939

2,157,043

UNITED STATES PATENT OFFICE 2,157,043

INTERLOCKING CONTROL SYSTEM

Daniel V. Waters, South Orange, N. J., assignor to Western Electric Company, Incorporated, New York, N. Y., a corporation of New York Application September 1, 1937, Serial No. 161,979

8 Claims. (Cl. 192—135)

This invention relates to an interlocking control system and more particularly to an interlocking system of operating control and safety control devices for potentially dangerous machines.

There are many types of machines which include parts, and especially heavy rotary elements, moving normally at high speeds and with great momentum, which machines present features of potential danger to both authorized operators and tenders and to unauthorized persons who may accidentally happen to expose themselves or their limbs to danger of serious injury. Among such machines are many which are used in handling strands especially in the arts of making and combining various types of electrical conductor strands, and which machines frequently include fliers and the like more or less massive parts intended to rotate at relative high speeds.

An object of the present invention is to provide for apparatus having potentially dangerous moving parts an interlocking system of means whereby to prevent access to the apparatus while in dangerous motion and at the same time to afford easy access while the apparatus is at rest or in a state of controlled and harmless activity only.

With such object in view, one embodiment of the invention, as applied in the case of an apparatus comprising moving potentially dangerous parts, contemplates a housing enclosing the apparatus and having doors to give access, in combination with control circuits for starting and stopping the apparatus and safety circuits controlling the housing, the elements being so arranged and related that normal motion of the apparatus prevents opening the closed housing and is prevented by the open housing and so that both closing of the housing or normal motion of the apparatus is prevented if any part of the apparatus is not in its normal running position.

Other objects and features of the invention will appear from the following detailed description of one embodiment thereof taken in connection with the accompanying drawings in which the same reference numerals are applied to identical parts in the several figures and in which Fig. 1 is a diagrammatic elevation of one form of strand handling apparatus provided with an operating and safety system constructed in accordance with the invention;

Figure 1:
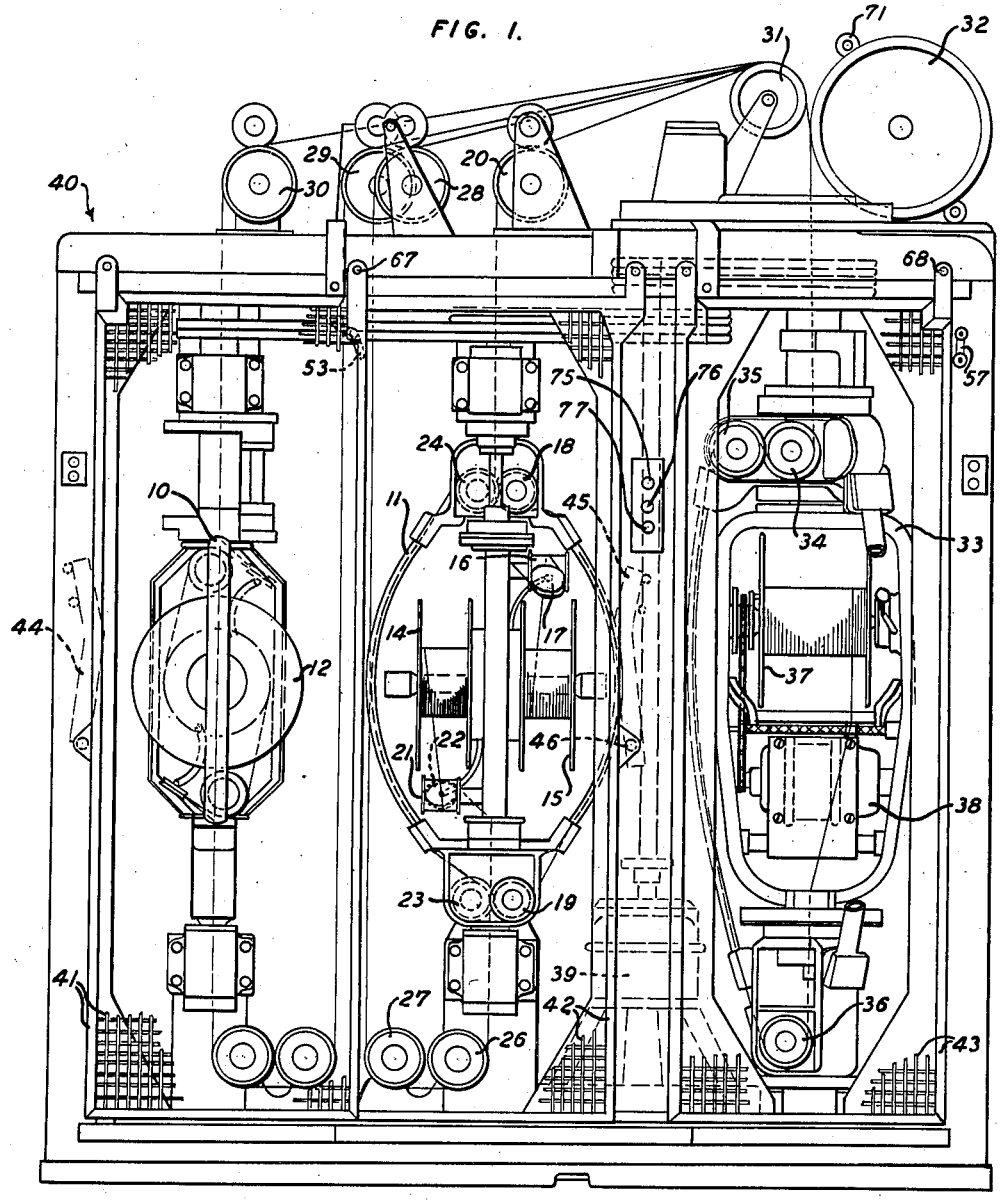

In the embodiment of the invention herein disclosed there is shown a safety and operating control system applied to a machine for twisting and intertwisting electrical conductor strands to form a compound strand or cable. While this machine and its structure and mode of operation are no part of the present invention, it is thought necessary to describe the machine and its operation in some detail in order that the invention, which relates to a housing for the machine and various electrical circuits associated with both machine and housing, may be clearly understood.

Identically similar fliers 10 and 11, each having two operative arms, are revolubly mounted side by side in a vertical position. Each is revoluble about a pair of supply reels 12 and 13 or 14 and 15 respectively, which are rotatably but not normally revolubly supported within the fliers. In the case of the flier 11, strand from the reel 15 passes over the roller 16 and the sheave 17, both mounted on the supply reel support. Thence the strand passes over the sheave 18 and into the right arm of the flier 11, from which it emerges to pass over the sheave 19 and up through the flier and frame of the apparatus to the sheave 20, the sheaves 18 and 19 being mounted to revolve with the flier. Similarly, a strand from the supply reel 14 passes over the roll 21, the sheave 22, the sheave 23, through the left arm of the flier 11, over the sheave 24, down the axis of the flier, and over the sheaves 26 and 27 to the outside guide sheave 28. In the same way, strands from the reels 12 and 13 emerge over guide sheaves 29 and 30.

The four strands from the sheaves 20, 28, 29 and 30 pass thence over a common grooved guide roll 31, around a capstan 32 and down the axis of a third flier 33. The strands then pass under the sheave 34, over the sheave 35, down the left arm of the flier, under the sheave 36, and up the axis of the flier to a take-up reel 37. This take-up reel is mounted inside the flier to be rotatable but not revoluble and is driven in rotation by a motor 38 similarly mounted.

All the above apparatus generally, except the take-up reel 37, is driven by suitable gearings and transmission means from a motor 39.

Figure 5:
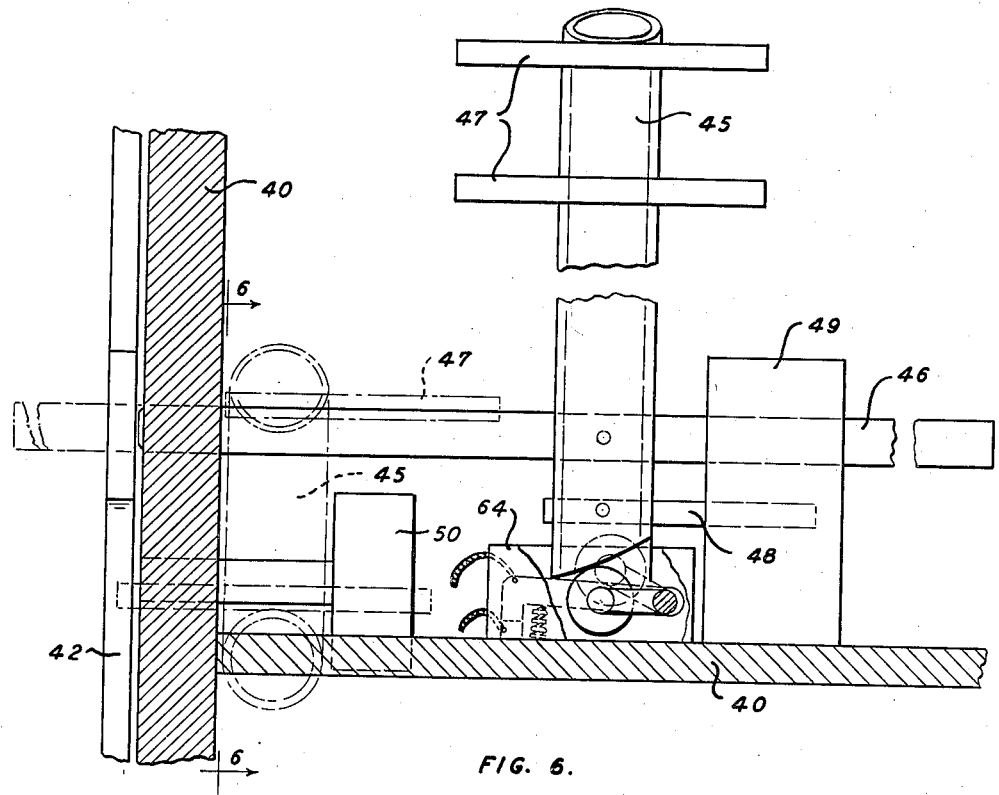
Fig. 5 is an enlarged broken plan view of an auxiliary device.
Figure 6:
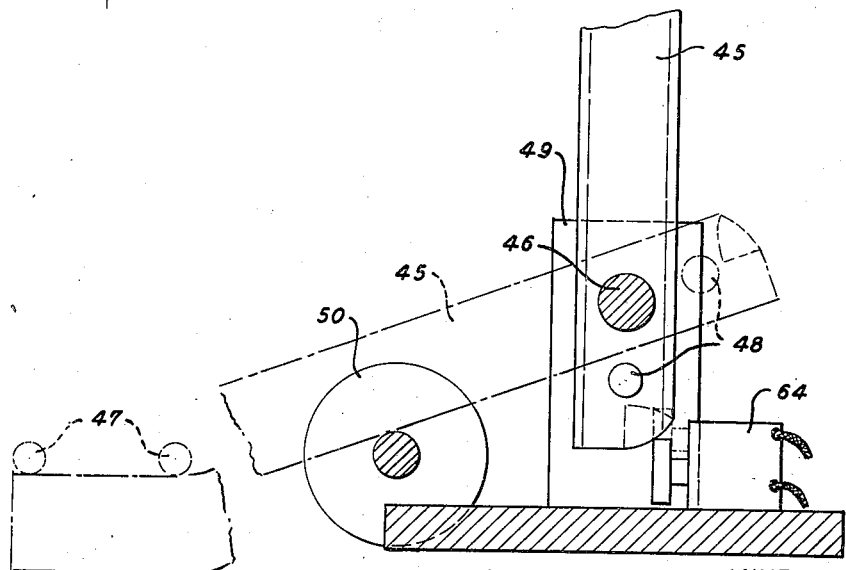
Fig. 6 is a view on the line 6—6 of Fig. 5.

For convenience and safety in replacing empty reels 12, 13, 14 or 15 with full ones, auxiliary supports 44 and 45 are pivotably and slidably mounted on parts of the cage 40. These two supports are substantially identical in structure and operation, and a description of one will suffice for the other also. The support 45 comprises a rigid, tubular arm 45, the main member of the support, through which, near one end, passes a rigidly attached transverse shaft 46, slidably and rotatably supported in suitable brackets secured to the left end wall of the cage 40. Thus the arm 45 and shaft 46 may be slid to and fro along the end wall from front to back and may also be pivoted, when in the extreme forward position, to allow the upper or outer end of the arm 45 to lie in front of and below the stub shaft which supports the reels 14 and 15. The arm 45 is provided with a pair of rigidly attached crossbars 47, upon which a full reel to be exchanged for the reel 14 or 15 may be placed and then slid conveniently into place when the arm is in the dotted line position of Fig. 6. The lower or inner end of the arm 45 is bevelled as indicated in Figs. 5 and 6 for a purpose to be explained later. The right hand frame of the door 42 covers the front end of the shaft 46 when the shaft is slid to its extreme rear position and the door is closed. When the door 42 is open and the shaft 46 is moved forward to any appreciable extent, the front end of the shaft extends through the cage 40, as shown in dotted lines in Fig. 5, into the path of the door and prevents the latter from being closed until the shaft is completely retired. The arm 45 is also provided, near its lower end, with a rigidly attached pin 48 adapted, when the shaft is in its retired position and the arm is in its vertical position, to enter a corresponding bore in a block or member 49 secured to the cage 40 and which may conveniently be also one of the supports for the shaft 46. The pin 48 thus serves to retain the arm 45 in its raised and retired position when out of use. When in the operative position shown in dotted lines in Figs. 5 and 6, the arm 45 may preferably be supported by a saddle block 50 secured to a member of the cage.

It was stated above that reels 12, 13, 14 and 15 are supported so as to be rotatable but not normally revoluble. The support is such that it may be manually rotated against friction means or ratchet means or the like, oppositely to the normal direction of rotation of the fliers, to bring any of the four reels to the front, as is shown in Fig. 1 in the case of the reel 12, for interchange of reels. The three fliers 10, 11 and 33 and the motor 39 are mounted, with their various auxiliary devices except the sheaves 26, 28, 29 and 30, the roll 31 and the capstan 32, within a suitably proportioned safety cage generally indicated at 40. The cage 40 comprises a base upon which the apparatus is mounted, end walls, top wall and rear wall which may be of any suitable construction, preferably expanded metal panels, supported on and secured to appropriate structural metal members. The front wall of the cage consists principally of three sliding doors 41, 42 and 43, hung from tracks in any suitable and familiar way. Of these doors, the right and center ones, indicated at 42 and 43, run on the same track, and the left door, indicated at 41, runs closely in front of door 42 on a separate track. Thus access may be had to any one of the three fliers, but to only one at a time.

When doors 41 and 42 are both closed, i. e., moved apart as far as possible, they still overlap a little. Immediately above the overlap a limit switch 51 of any appropriate construction, operated by moving the lever arm 52, is mounted on the cage. The door 41 carries, pivotably mounted therein, a bell crank lever 53 of which the arm 54 can be caused to shift the switch lever 52 when the door 41 is in its closed position, but not otherwise. The door 42 carries a roller 56 mounted thereon in such fashion that when the door 41 is closed and the door 42 is closed, the roller 56 acts on the arm 55 of the lever 53 to cause the arm 54 of the lever to raise the arm 52 of the switch 51 to close a circuit therethrough only when both doors are closed completely.

Figure 4:
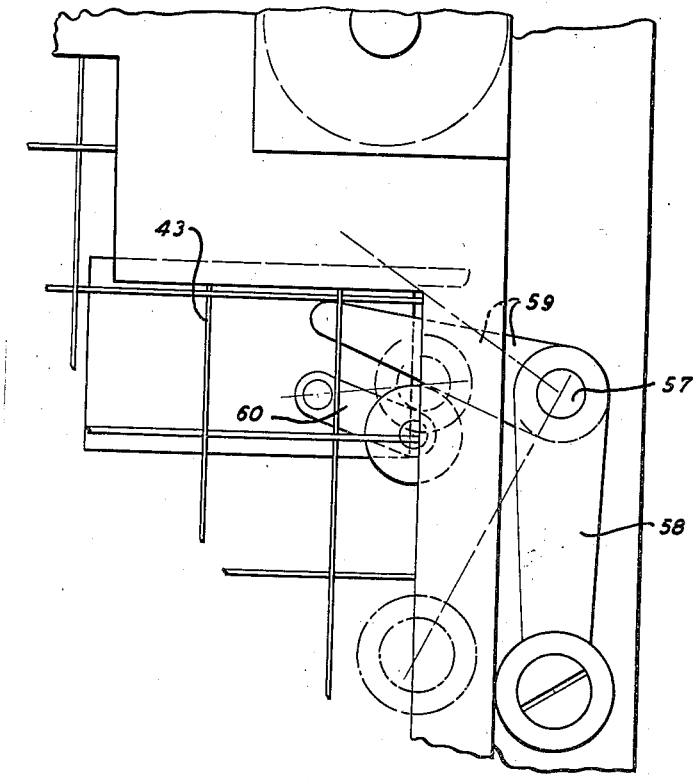
Fig. 4 is a similar view showing another switch.

Beside the right edge of the door 43 a bell crank lever 57 having arms 58 and 59 is mounted in the cage in such position that arm 58 is forced and held in the full line position of Fig. 4 by the closing of the door 43. In this position of the lever 57, its arm 59 is caused to actuate the lever 60 of a limit switch 61 also mounted in the cage. These parts are so arranged that the switch 61 is closed only when the door 43 is fully closed.

Similar switches 63 and 64 are mounted in the cage in appropriate locations to be actuated to close, as shown in Figs. 5 and 6, by the supports 44 and 45 respectively when the latter are in their upright and retired positions.

On the under side of the top of the cage, lock rods 65 and 66 are mounted to be slidable to and fro from back to front of the cage, and when in their forward positions to enter corresponding apertures 67 and 68 in the doors 41 and 42, and in the door 43 respectively, to lock the doors against being opened. These rods 65 and 66 are integral with or attached to the cores of solenoids 69 and 70 respectively to be operated thereby. The rods 65 and 66 are provided with springs not shown but of any suitable construction and arrangement which continually urge the rods rearward.

Associated with the capstan 32, is a pressure roller 71, which serves, when pressed against the capstan drum to maintain the strands running over the drum in close contact therewith should any one or more of the strands break or otherwise loosen on the drum while the capstan is running. The roller 71 is carried on a crank which is actuated by a solenoid 72.

A main braking mechanism of any suitable construction normally operative to slow down and stop the main drive motor 39, is arranged to be held out of operation by a solenoid 73 when energized.

Figure 2:
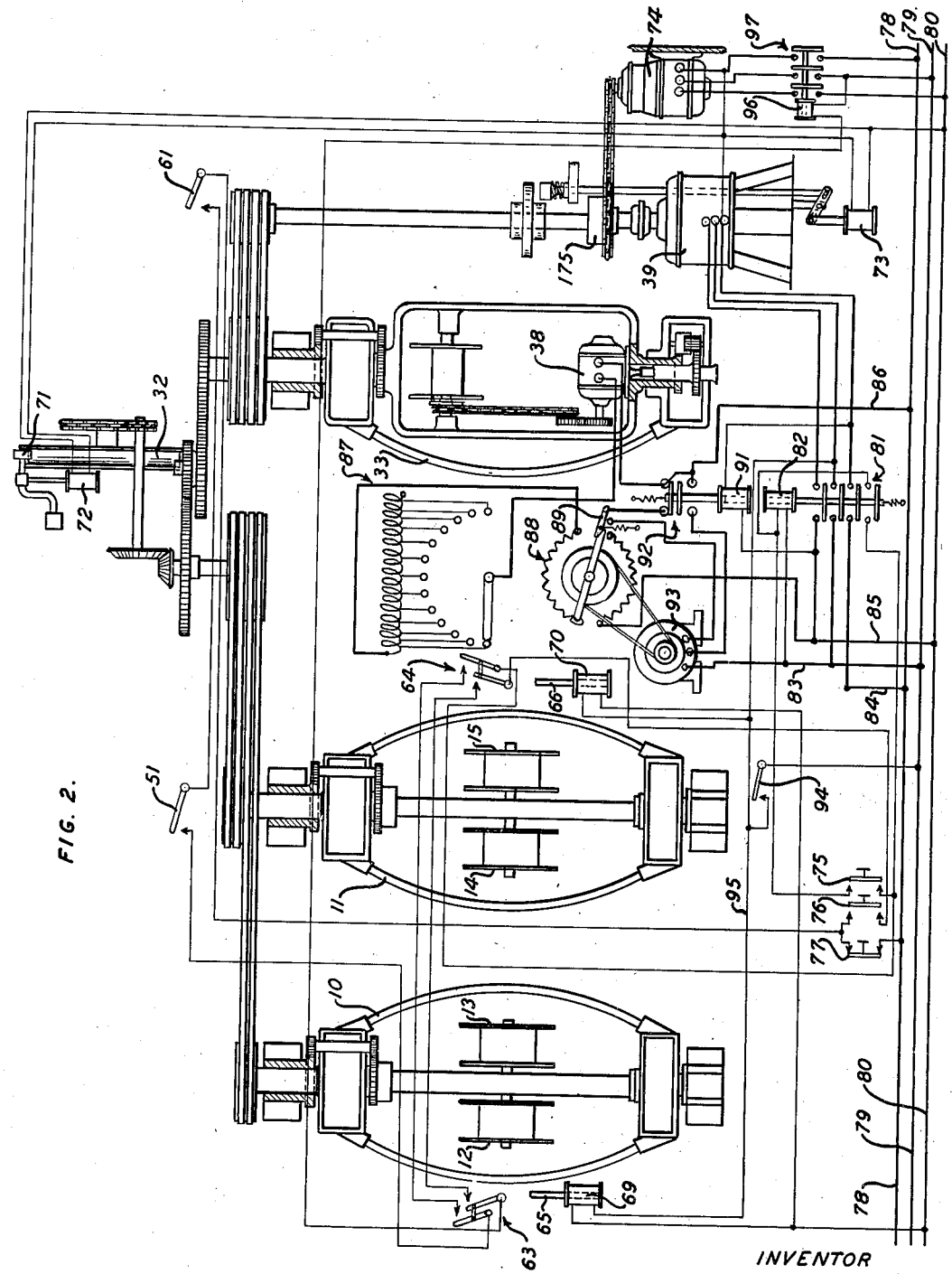
Fig. 2 is a schematic view showing the electric circuits thereof.
Figure 3:
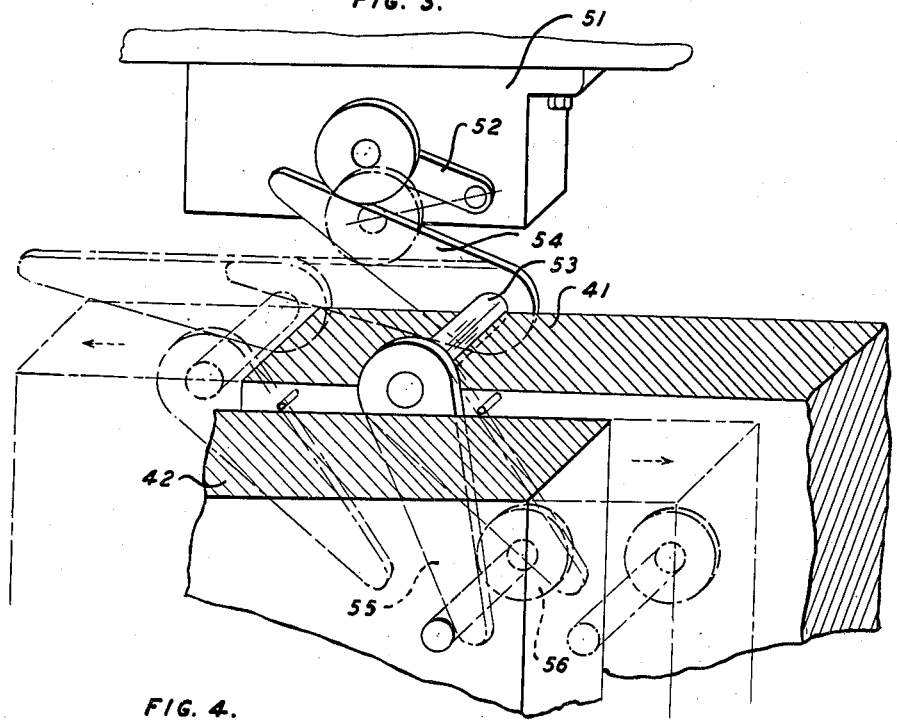
Fig. 3 is an enlarged broken detail showing one of the switches.

A secondary drive motor 74, shown in Fig. 2 but omitted in Fig. 1 for clarity, is coupled mechanically to the main drive shaft, through an overrunning clutch device 175 of any suitable and familiar construction, so that when the main motor is not energized the secondary or "jogging" motor 74 may be used to turn over the mechanism generally at low speed. The motor 74, however, is not driven by the motor 39 when the latter is energized and the former is not, because of the overrunning clutch 175.

Three push button switches 75, 76 and 77, labelled respectively "Start", "Jog" and "Stop" are conveniently mounted on a cage frame member. Of these, 75 and 76 are normally open and 77 is normally closed.

Power is supplied to the apparatus from any convenient three phase A. C. source not shown through mains 78, 79 and 80.

The lower side of the normally open "Start" button 75 is connected in series through the switches 64, 63, 51 and 61 and through the normally closed "Stop" button 77 to the main 78. The upper side of the button 75 is connected to a branch point near the solenoid 82 which actuates a four blade switch 81. From this branch point one path leads through the solenoid winding and via a leader 83 to the main 79. Thus, closing the "Start" switch 75 closes the switch 81. A second path leads from the main 79 through the leader 83 and the solenoid winding to the same branch point and thence through the fourth or lowest of the four circuit closures of the switch 81, through the switches 64, 63, 61 and 51 and the stop switch 77 to the main 78. Hence when the switch 81 has once been closed this second path carries current to the solenoid to keep the switch 81 closed although the switch 75 has opened again and until one or another of the switches 51, 61, 63, 64 or 77 is opened.

At the closing of the switch 81, current also passes from the main 80 through the solenoids 69 and 70 in parallel and through the second or next to the top circuit closure of the switch 81 to the leader 83 and so to the main 79. Thus the solenoids 69 and 70 are energized when the switch 81 is closed by closing the switch 75.

It will be evident from a study of the above that unless the supports 44 and 45 are completely retired and up to close the switches 63 and 64 and unless the three doors 41, 42 and 43 are each fully closed, thus closing the switches 51 and 61, the switch 81 cannot be closed by closing the start switch 75. Also as soon as the switch 81 closes, the doors are locked in closed position by the rods 65 and 66 actuated by the solenoids 69 and 70, and cannot be opened so long as the switch 81 is closed.

When the switch 81 is closed, current from the three mains passes up the leaders 83, 84 and 85, and through the upper three circuit closures of the switch 81 to the main drive motor 39, thus driving all the mechanism of the apparatus except the take-up drive. Because of the mass and inertia of the mechanism generally, it is not harmful to the strands to have full power thus thrown abruptly into the main motor; but to start the relatively light take-up mechanism with a jerk would seriously damage if it did not break the strands. The take-up must be artificially accelerated at a rate to correspond with the natural acceleration of the fliers.

For this reason current is fed to the single phase take-up motor 38 from the main 78 via a leader 86 and passes from the motor through an adjustable rheostat 87 and a variable rheostat 88 and the leader 85 to the main 80. When the machine is idle, the variable rheostat is in the position shown, in which its rotatable contact bar is in its extreme counterclockwise position and the lower end of the bar is just out of contact with the lower arcuate resistance so that the circuit is broken at this point. Furthermore, in this position, the contact bar holds the switch 89 open. Hence no current flows as yet to the motor 38. However, closing the switch 81 has closed a circuit from the main 80, through the leader 85, and through the solenoid 91 which actuates the switch 92, and back to the main 78. Actuation of the switch 92 by the solenoid closes a circuit from the main 78, through the lower contacts of the switch 92, the motor 93 and the leader 83 to the main 79. The motor 93 then rotates the contact bar of the rheostat clockwise, first closing the circuit through the variable rheostat to the take-up motor and then gradually cutting the resistance of the variable rheostat out of the take-up motor field. At the same time the rotatable contact bar of the rheostat 88 has allowed the switch 89 to close, although no current passes therethrough as the upper contacts of the switch 92 are now open.

Meantime, the switch 81 has also closed a circuit from the main 78 through the leader 84 and in parallel through the solenoids 73 and 72 to the main 80, thus releasing the main brake controlled by the solenoid 73 and also the strand retainer 71 on the capstan controlled by the solenoid 72.

The machine is now in full normal operation. The doors 41, 42 and 43 are locked closed by the locking rods 65 and 66 which have been thrust forward and into the corresponding holes 67 and 68 of the doors by the solenoids 69 and 70, and are held there by the solenoids against the tension of the springs (not shown) which tend to withdraw the rods from their door locking position. The supply reel supports 44 and 45 being in their raised and retired positions, hold the limit switches 63 and 64 closed and are themselves in turn locked in place by their lock pins 48 being entered into the blocks 49. The limit switches 51 and 61 are held closed by the doors. Thus the several normal operating circuits described above are closed through the switches 51, 61, 63 and 64, whose closed position depends upon the safe positions of the supply reel supports and the closed position of the doors. The apparatus generally can neither be started nor maintained in operation should any one of these switches be open or become open.

If it be desired to stop the machine normally, this is done by pressing the "Stop" button 77. This switch 77 is normally closed and is in a circuit, as described above, leading from the supply main 78 through the switches 61, 51, 63 and 64, through the fourth or lowest circuit closure of the switch 81, through the solenoid 82 of the switch 81 and the leader 83 to the supply main 79. It is this circuit which is energizing the solenoid 82 to keep the switch 81 closed, and opening this circuit by actuating the "Stop" button 77 causes the switch 81 to open cutting off the supply of power through the switch 81. Thus power is cut off from the main drive motor 39 and from the main brake solenoid 73. The brake is applied and the machine begins to decelerate. Power supply to the solenoid 91 is also cut off and the switch 92 breaks the circuit through its lower contacts and makes a circuit through its upper contacts. The switch 89 being at this time closed, as already described, the circuit thus established feeds the motor 93 to run reversely cutting in the resistance 88 gradually into the power supply of the take-up motor 38 which then decelerates in step with the rest of the machine. Finally the rotary arm of the rheostat 88 opens the switch 89 and cuts the supply of power to the motor 93 immediately after cutting the supply to the motor 38.

Meantime the opening of the switch 81 has broken the normal circuit, described above, through the solenoids 69 and 70, and unless other means to prevent were provided, the rods 65 and 66 would be withdrawn and the doors unlocked before the machine comes to rest. To this end, a rotary oil drag switch 94 is connected from the supply main 79 to the common supply line 95 for the two solenoids 69 and 70. The switch 94 is mechanically connected for rotary driving to any convenient and suitable rotating member of the machine; and is so constructed that the circuit through the switch is closed and thus the solenoids 69 and 70 energized to keep the doors locked, so long as the machine is in motion to any appreciable extent, but the circuit is broken when, but not before, the machine comes substantially to rest. The construction and mode of operation of the switch 94 are no part of the present invention; but reference may be had, if desired, to U. S. Patent 1,677,008, issued July 10, 1928 to G. R. Townsend, for a complete description of a suitable device for the purpose.

Assume now that the machine is normally stationary and that it is desired to operate it slowly while threading new strands or a repaired broken strand into place or for some other reason, while one or other of the doors is open. Obviously it must not be possible to do this unless both reel supports 44 and 45 are retired and safely out of the path of the fliers 10 and 11. The stop switch 77 is then in its normal closed position and connects the upper contact of the jog switch 76 to the supply main 78. Closing the switch 76 then closes a circuit from the lower contact of switch 76 through switches 64 and 63, but not via switches 51 and 61, and through the solenoid 96 to the supply main 79. Solenoid 96, thus energized, closes the switch 97 which supplies power to the jog motor 74 which then runs as long as the switch 76 is held closed.

When the switch 97 is thus closed a circuit is also closed through the right hand contacts of the switch 97 and the solenoid 72 and another circuit through the same contacts and the solenoid 73 to bring the retainer 71 down on the capstan 32 and to release the main brake controlled by the solenoid 73. A third circuit through the same contacts is also closed which actuates the solenoid 91 to operate the switch 92 to start the motor 38.

Thus the entire machine can be jogged along in the forward direction, even if one of the doors is open, so long as the supports 44 and 45 are in safe position, by closing the switch 76 and will jog thus only as long as this switch is closed. The moment the machine starts, the oil drag switch 94 will close and energize the solenoids 69 and 70 to push the lock bars 65 and 66 forward. In the present instance this is both unnecessary and harmless.

The invention, of necessity, has been disclosed in a very minutely detailed manner as embodied in combination with a complex and minutely described machine. Obviously the embodiment disclosed is illustrative only and may be modified and departed from in many ways without departing from the spirit and scope of the invention as pointed out in and limited solely by the appended claims.

What is claimed is:

1. The combination with an apparatus having a moving part and an electric motor to drive the apparatus, of safety means comprising a housing to enclose the apparatus, a movable door in the housing, a safety switch within the housing and actuable by the door to close only when the door is closed, locking means for the door within the housing and actuable by a solenoid to lock the door, a control switch within the housing and actuable by a solenoid to supply current to the motor, and an operating switch, the operating switch, the solenoid of the control switch, the solenoid for the locking means, and the safety switch being all in series with a source of electric current.

2. The combination with an apparatus having a moving part and an electric motor to drive the apparatus, of safety means comprising a housing to enclose the apparatus, a movable door in the housing, a safety switch within the housing and actuable by the door to close only when the door is closed, a second safety switch within the housing and actuable by an adjustable member of the apparatus to close only when the member is in an inoperative position, locking means for the door within the housing and actuable by a solenoid to lock the door, a control switch within the housing and actuable by a solenoid to supply current to the motor, and an operating switch, the operating switch, the solenoid of the control switch, the solenoid for the locking means, and the two safety switches being all in series with a source of electric current.

3. The combination with an apparatus having a moving part and an electric motor to drive the apparatus, of safety means comprising a housing to enclose the apparatus, a pair of doors in the housing, a safety switch within the housing and actuable by both of the doors simultaneously only to close only when both of the doors are closed, locking means within the housing and including a solenoid to actuate the same to lock the door for each of the doors, a control switch within the housing and actuable by a solenoid to supply current to the motor, and an operating switch, the operating switch, the solenoid of the control switch, each of the solenoids for the two locking means, and the safety switch being all in series with a source of electric current.

4. The combination with an apparatus having a moving part and an electric motor to drive the apparatus, of safety means comprising a housing to enclose the apparatus, a pair of doors in the housing, a safety switch within the housing and actuable by both of the doors simultaneously only to close only when both of the doors are closed, a second safety switch within the housing and actuable by an adjustable member of the apparatus to close only when the member is in an inoperative position, locking means within the housing and including a solenoid to actuate the same to lock the door for each of the doors, a control switch within the housing and actuable by a solenoid to supply current to the motor, and an operating switch, the operating switch, the solenoid of the control switch, each of the solenoids for the two locking means, and the two safety switches being all in series with a source of electric current.

5. In a safety and control system for an apparatus having a moving part and an electric motor to drive the apparatus, safety means for the apparatus comprising a housing to enclose the apparatus, a pair of parallel running sliding doors in the housing, safety switch means within the housing and actuable by both of the doors simultaneously only to close only when both of the doors are closed, and means actuated by the safety switch means to lock the doors.

6. In a safety and control system for an apparatus having a moving part and an electric motor to drive the apparatus, safety means for the apparatus comprising a housing to enclose the apparatus, a pair of parallel running sliding doors in the housing, and safety switch means actuable by both of the doors simultaneously only to close only when both of the doors are closed, the said switch means including a lever pivotally mounted on one of the doors and bodily movable therewith, a member on the other door to abut against one arm of the lever to actuate the same, a switch mounted within the housing to be actuated by the other arm of the lever, and means actuated by the last named switch to lock the doors.

7. The combination with an apparatus having a moving part and an electric motor to drive the apparatus, of safety means comprising a housing to enclose the apparatus, a movable door in the housing, locking means for the door within the housing and actuable by a solenoid to lock the door, and a rotary electric switch within the housing and driven by motion of the apparatus and closed when in motion to actuate the locking means and open when stationary, the solenoid and the switch being in series with a source of electric current.

8. In an apparatus having a moving part, an electric motor to drive the apparatus, a housing enclosing the moving part and the motor, and a movable door in the housing, the combination therewith of a safety system for the apparatus entirely within the housing and comprising a safety switch actuable by the door to close only when the door is closed, locking means for the door actuable by a solenoid to lock the door, and a control switch actuable by a solenoid to supply current to the motor, the safety switch and the two solenoids being connected in series to an operating switch accessible from outside of the housing.

DANIEL V. WATERS.